Aug. 5, 1958 R. C. GOERTZ ET AL 2,846,084
ELECTRONIC MASTER SLAVE MANIPULATOR
Filed June 21, 1955 11 Sheets-Sheet 7

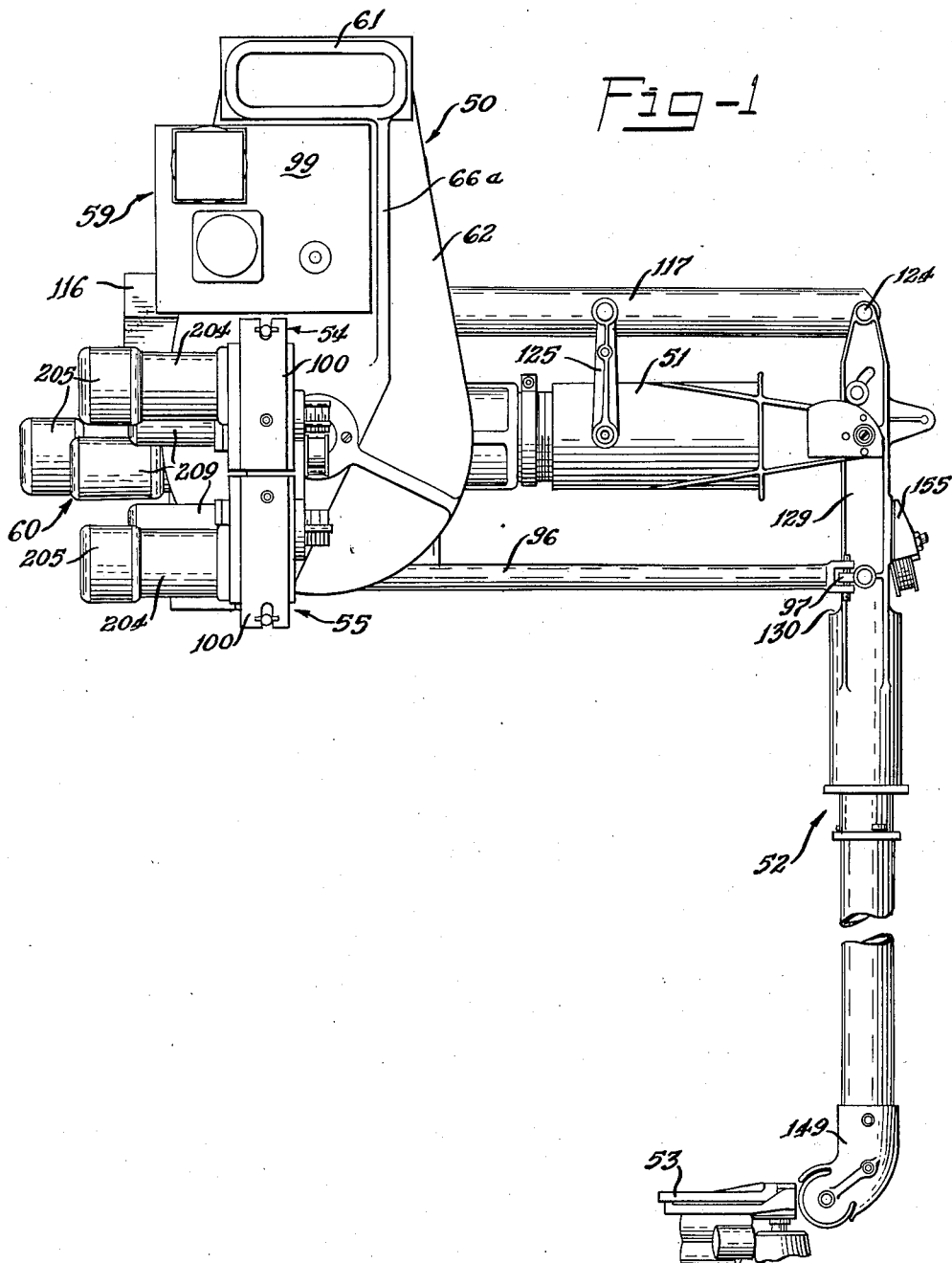

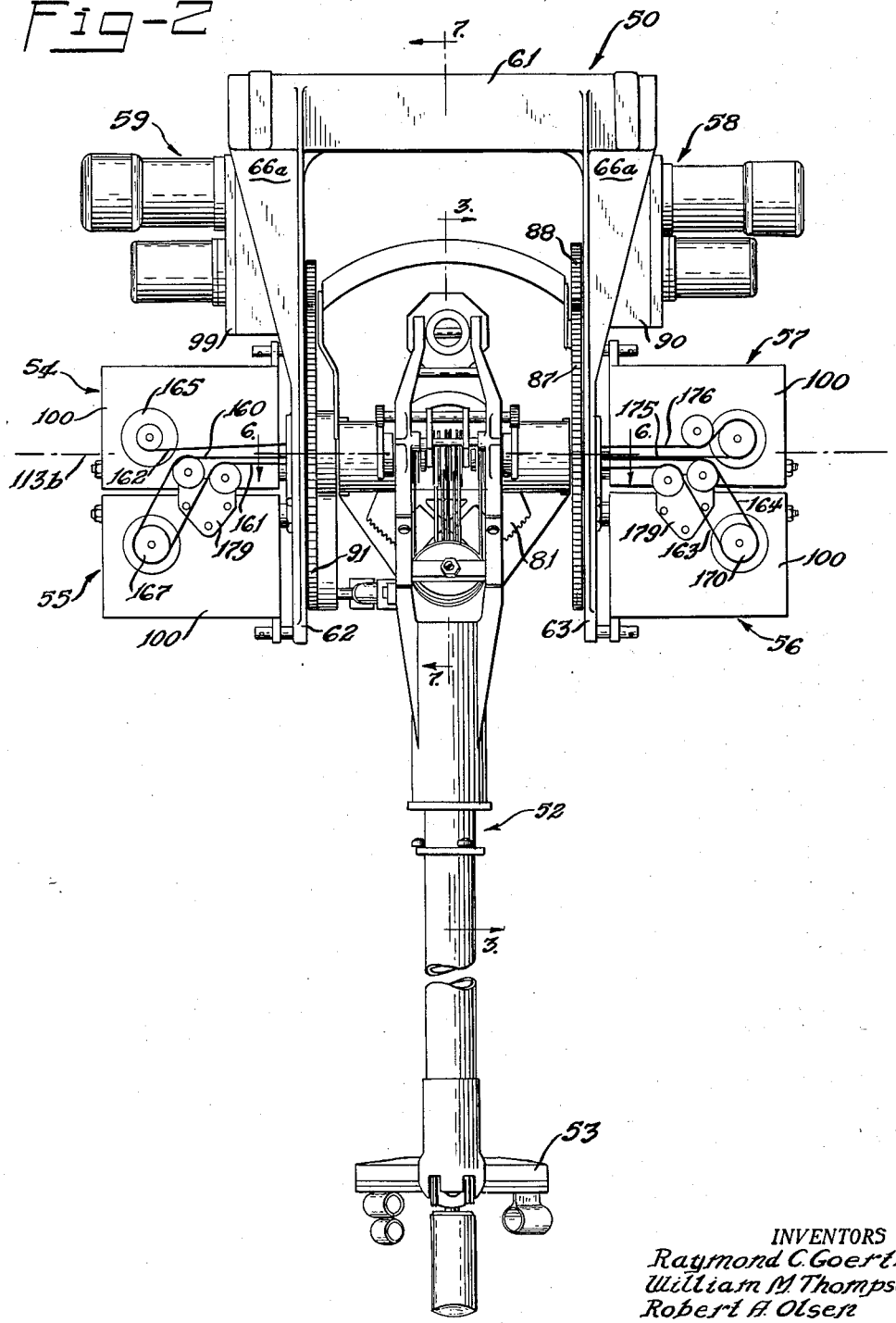

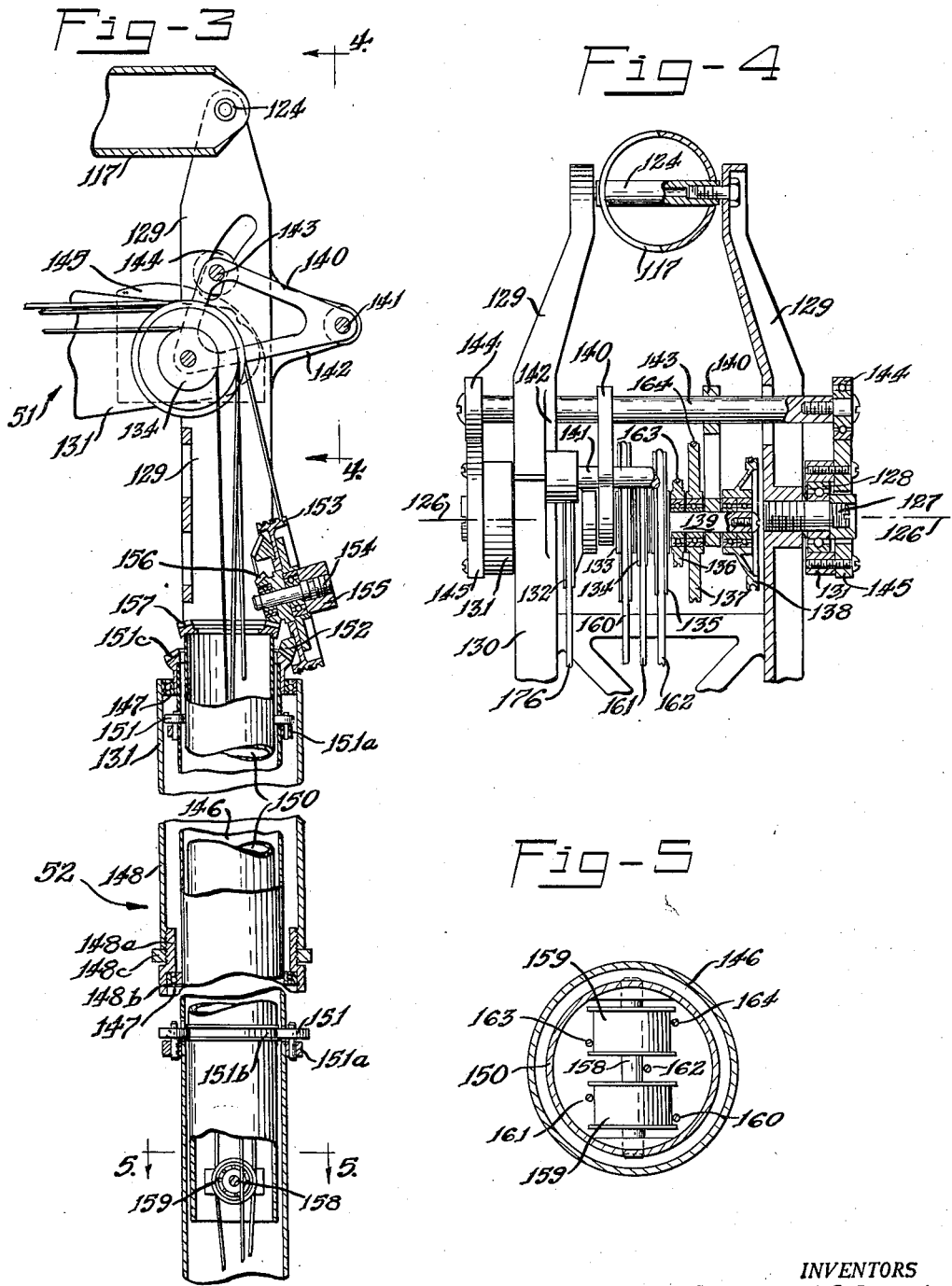

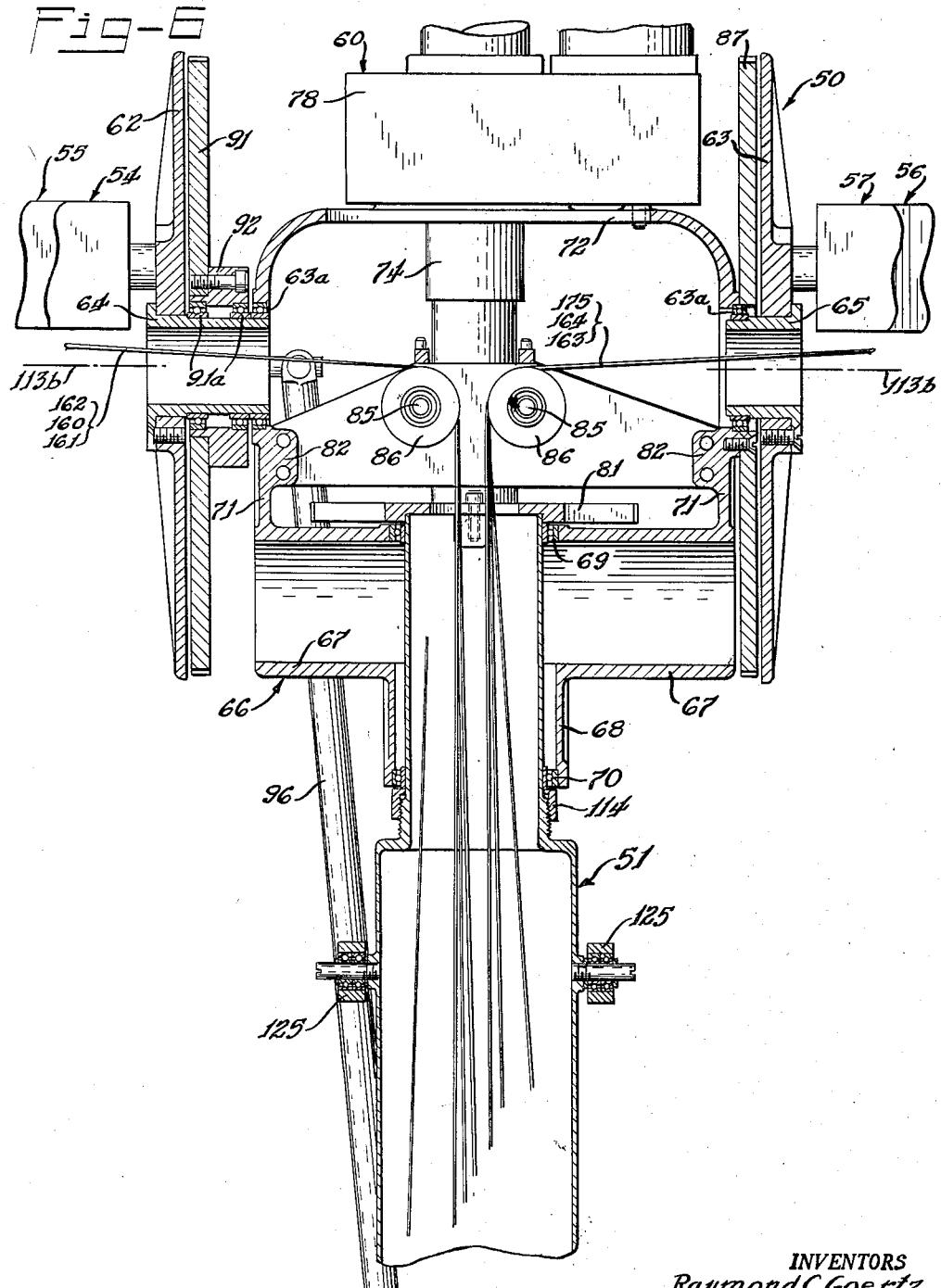

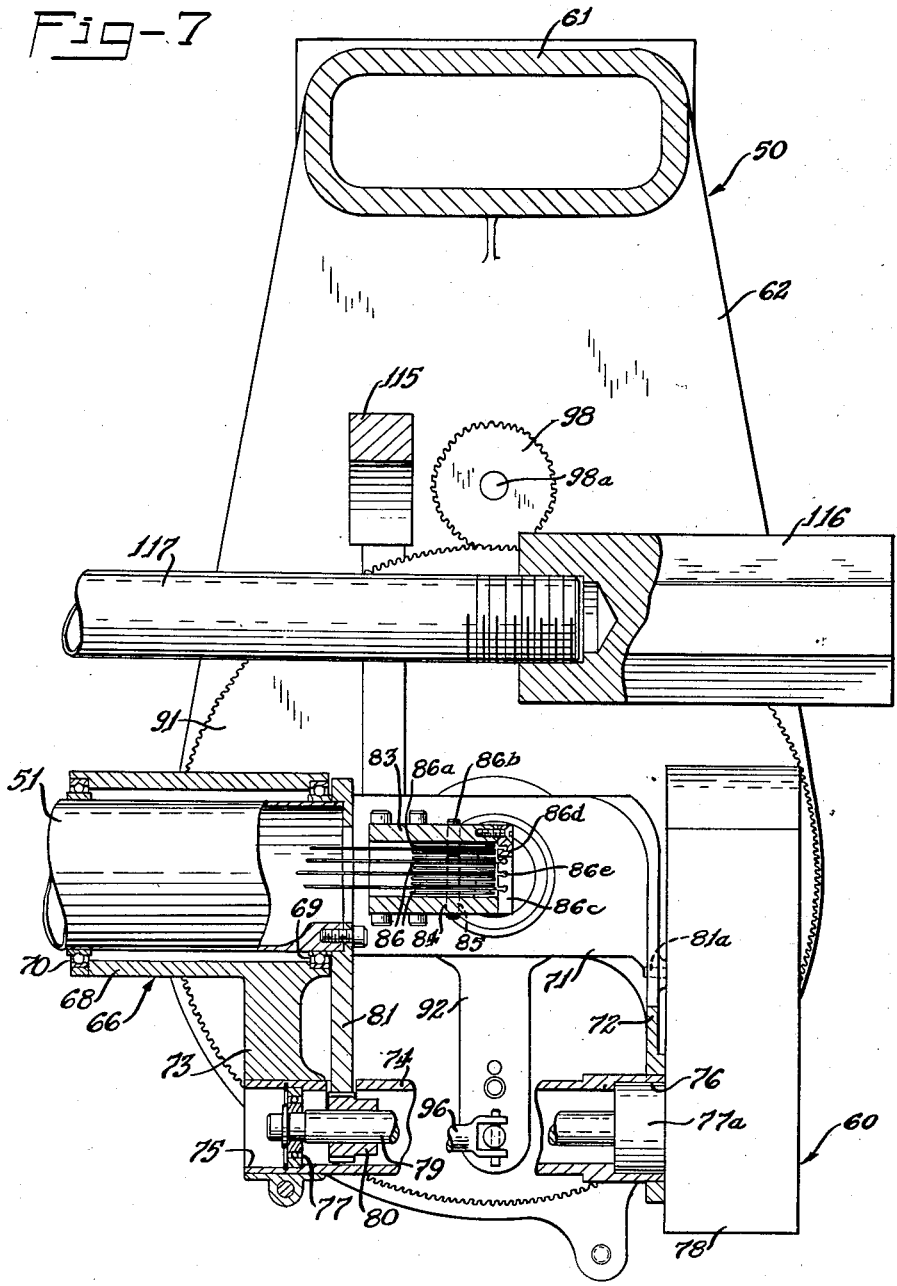

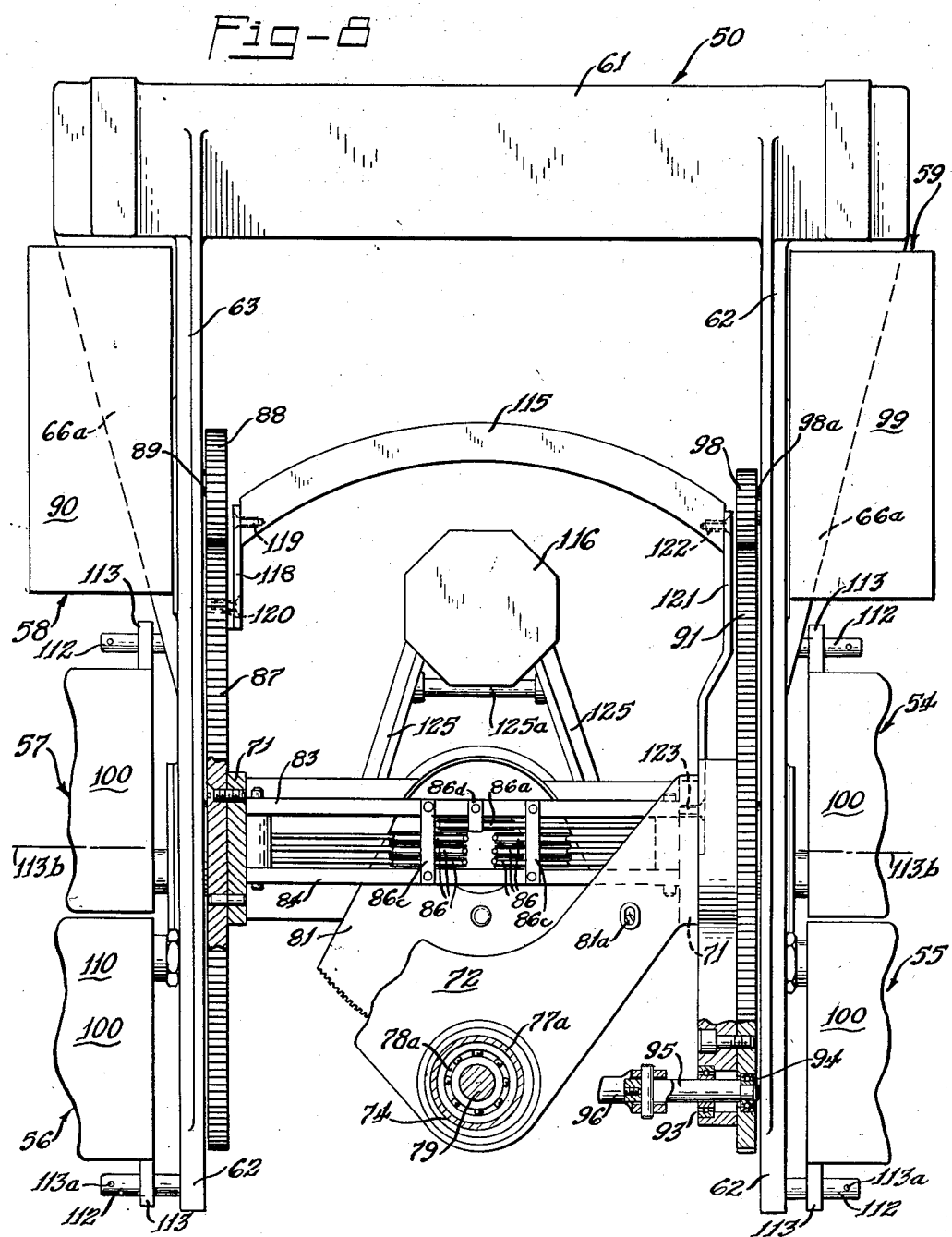

INVENTORS
Raymond C. Goertz
William M. Thompson
Robert A. Olsen

By: *Roland A. Anderson*
Attorney

Aug. 5, 1958
R. C. GOERTZ ET AL
2,846,084
ELECTRONIC MASTER SLAVE MANIPULATOR
Filed June 21, 1955
11 Sheets-Sheet 8
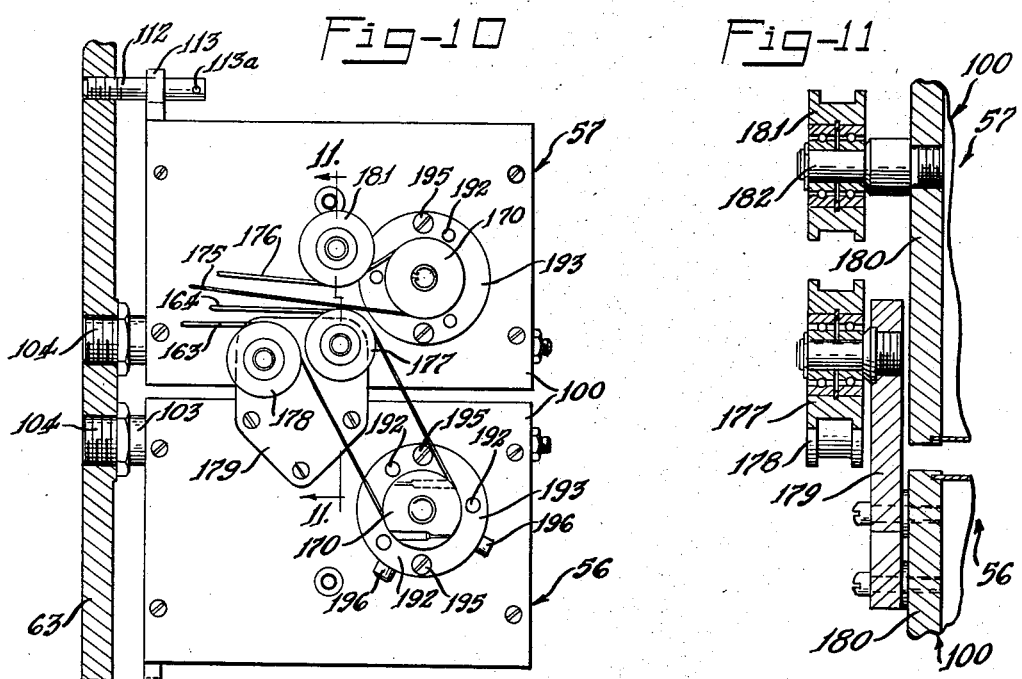
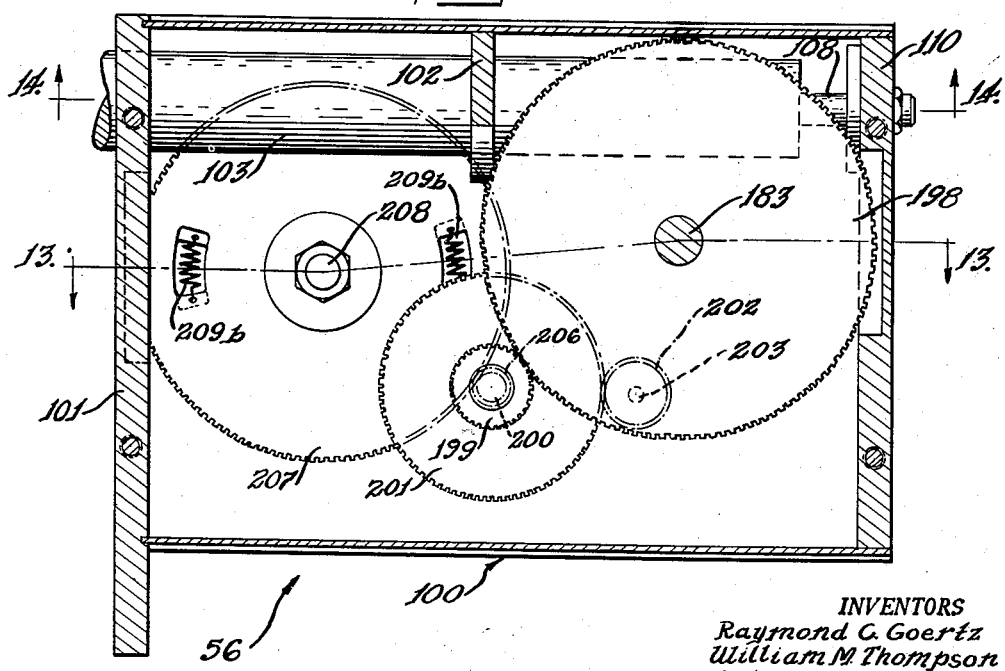
INVENTORS
Raymond C. Goertz
William M. Thompson
Robert H. Olsen
By Roland A. Anderson
Attorney Aug. 5, 1958   R. C. GOERTZ ET AL   2,846,084
ELECTRONIC MASTER SLAVE MANIPULATOR
Filed June 21, 1955   11 Sheets-Sheet 9
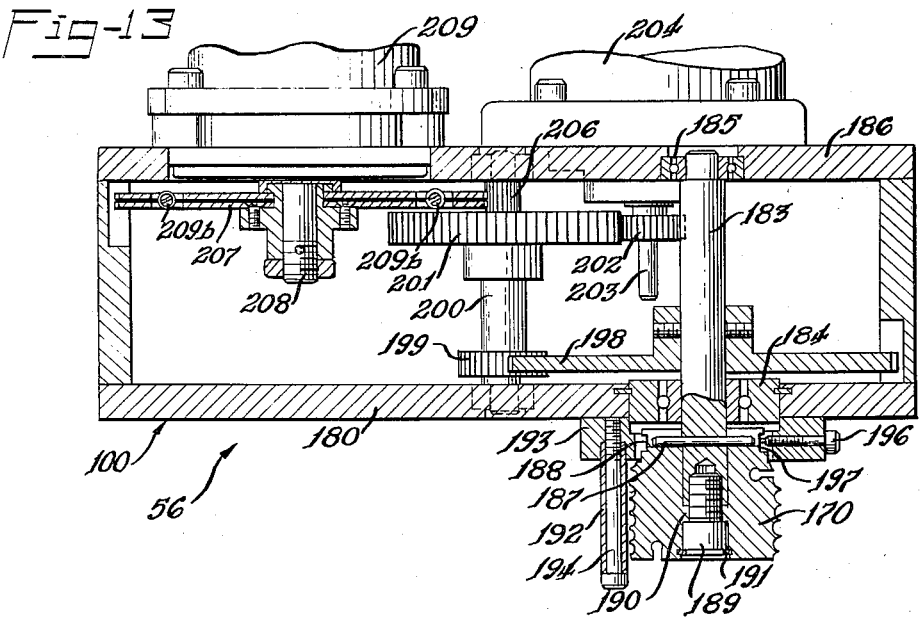
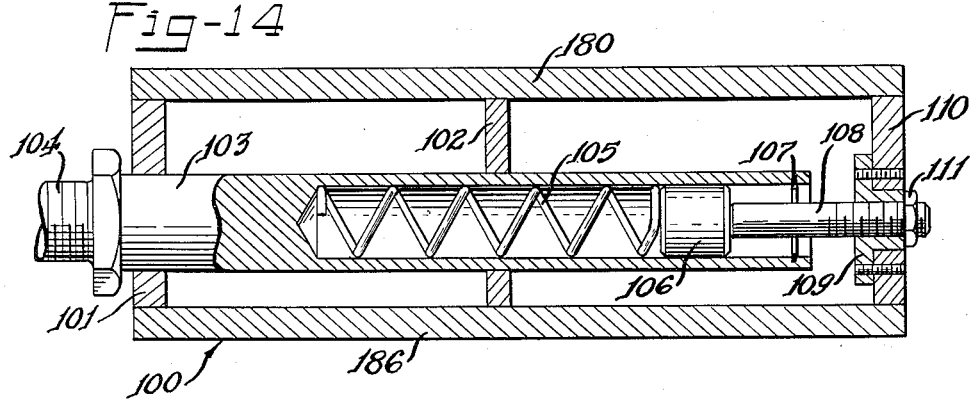
INVENTORS
Raymond C. Goertz
William M. Thompson
Robert H. Olsen
By: Roland A. Anderson
Attorney

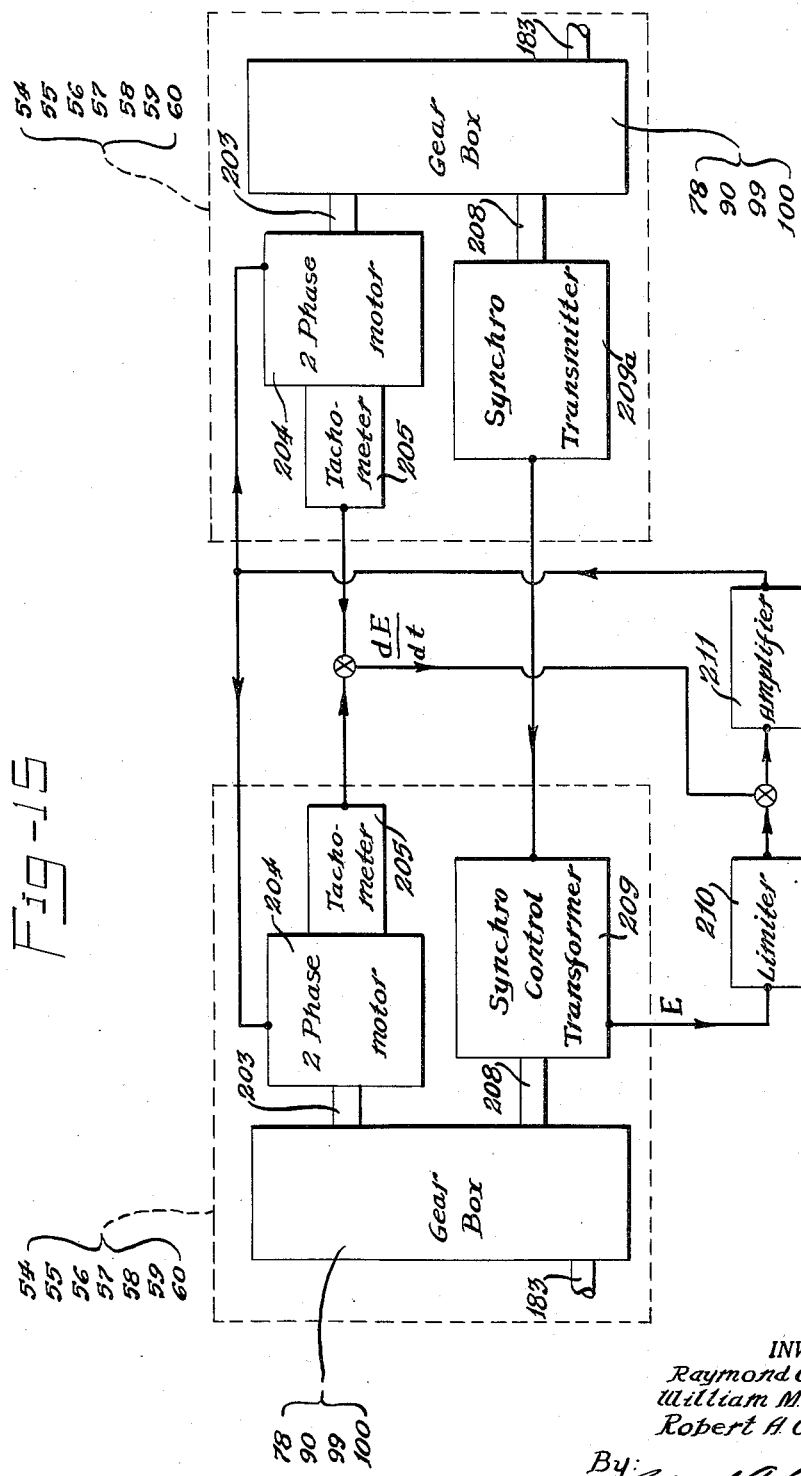

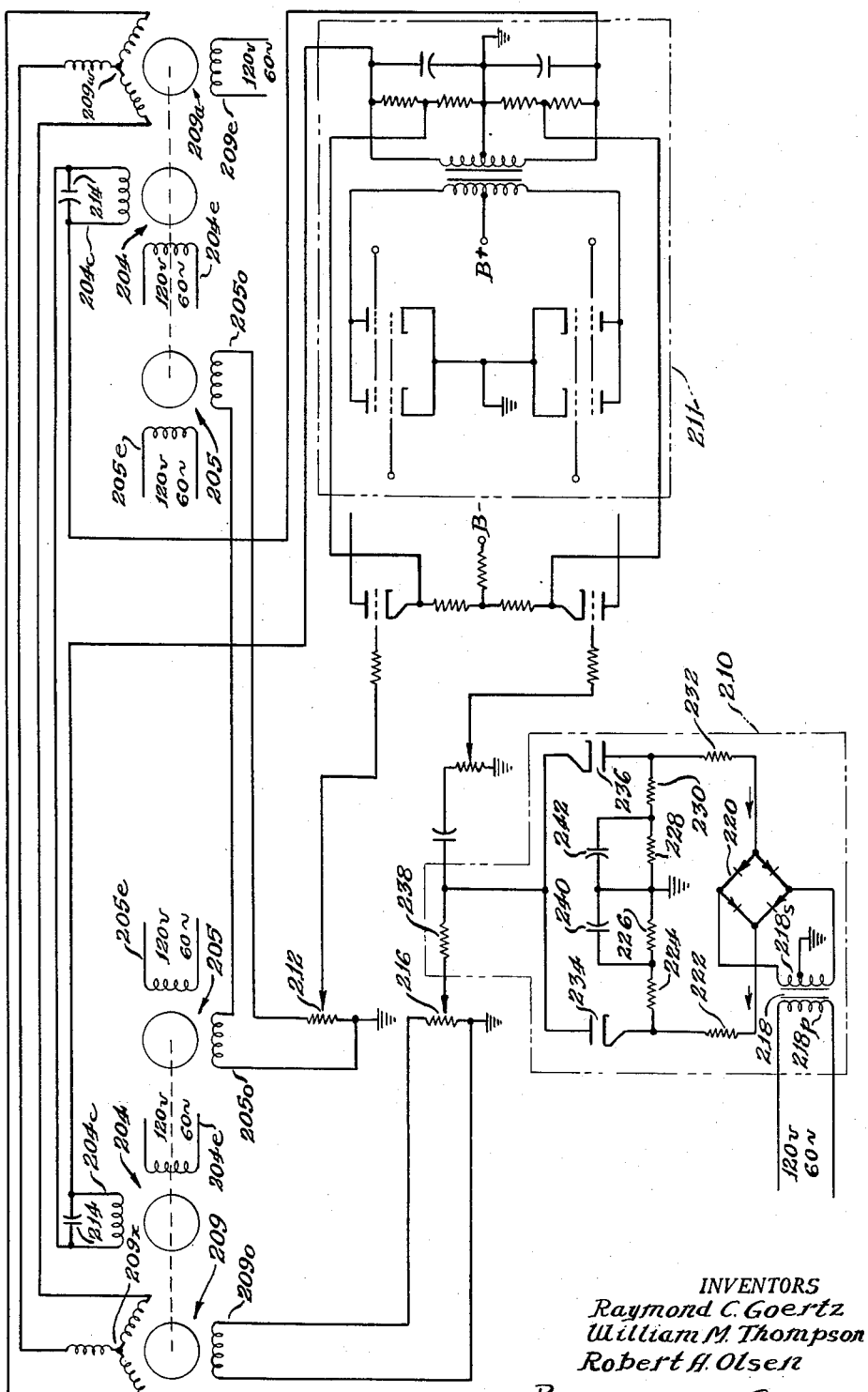

United States Patent Office 2,846,084
Patented Aug. 5, 1958

2,846,084

ELECTRONIC MASTER SLAVE MANIPULATOR

Raymond C. Goertz, Downers Grove, and William M. Thompson and Robert A. Olsen, Chicago, Ill., assignors to the United States of America as represented by the United States Atomic Energy Commission Application June 21, 1955, Serial No. 517,105

13 Claims. (Cl. 214—1)

The present invention relates to a remote-control manipulator of the type in which motions of a master unit against which an operator acts are reproduced by a slave unit acting against an object to be manipulated. More particularly, the instant manipulator is characterized by the employment of electrical connections between the master unit and the slave unit of the manipulator.

The substitution of electrical connections for mechanical connections between the master and slave units of a remote-control manipulator has the following advantages:

(1) Almost unlimited separation of the slave unit from the master unit;

(2) Possibility of completely sealing the slave unit in an enclosure;

(3) Possibility for the slave unit to have access to an almost unlimited space;

(4) Possibility for increasing load capacities to many times the capabilities of the human operator.

The elimination of mechanical connections between the master and slave units complicates the problem of providing proper response between the units, i. e., the transmission of a sense of "feel" from the slave unit to the master side to enable the operator at the master unit to feel resistance encountered at the slave unit, and causing the slave unit to follow the motions of the master unit as directly and speedily as possible. The sense of "feel" between master and slave units is highly desirable in order that fragile objects to be grasped such as beakers and test tubes be not broken, delicate objects be not unduly squeezed, and that immovable objects be not needlessly pushed or pulled.

An object of the present invention is therefore to provide electrical connections between the master and slave units of a manipulator, which connections produce a proper response between the units as aforesaid.

A further object is the provision of master and slave units of special mechanical design that ideally suits the units for electrical interconnections.

In the drawings:

Fig. 1 is an elevational view of a master assembly of the remote-control manipulator of the present invention;

Fig. 2 is an end view of the master assembly;

Fig. 3 is a vertical sectional view taken on the line 3—3 of Fig. 2 and illustrating the vertical arm of the master unit;

Fig. 4 is a vertical view partly in section as indicated by the line 4—4 of Fig. 3 and partly in elevation, and shows the mounting of cable guides at the interconnection of horizontal and vertical arms;

Fig. 5 is a horizontal sectional view taken on the line 5—5 of Fig. 3;

Fig. 6 is a horizontal sectional view taken on the line 6—6 of Fig. 2 and showing how the horizontal arm is carried;

Fig. 7 is a vertical sectional view taken on the line 7—7 of Fig. 2 and illustrating the mounting of the horizontal arm;

Fig. 8 is an elevational view illustrating the mounting of certain assemblies on the support;

Fig. 10 is an elevational view, partly in section, of two gear boxes connected with certain cables shown in Fig. 9;

Fig. 11 is a vertical sectional view taken on the line 11—11 of Fig. 10;

Fig. 12 is a vertical sectional view through the lower gear box of Fig. 10;

Fig. 13 is a horizontal sectional view taken through the lower gear box on the line 13—13 of Fig. 12;

Fig. 14 is a horizontal sectional view taken on the line 14—14 of Fig. 12 and showing the adjustable mounting of the gear box;

Fig. 15 is a diagrammatic view showing one of a plurality of duplicate electrical systems interconnecting the master and slave units of the manipulator; and Fig. 16 is a schematic circuit diagram illustrating portions of the system of Fig. 15 in greater detail.

Figure 9:
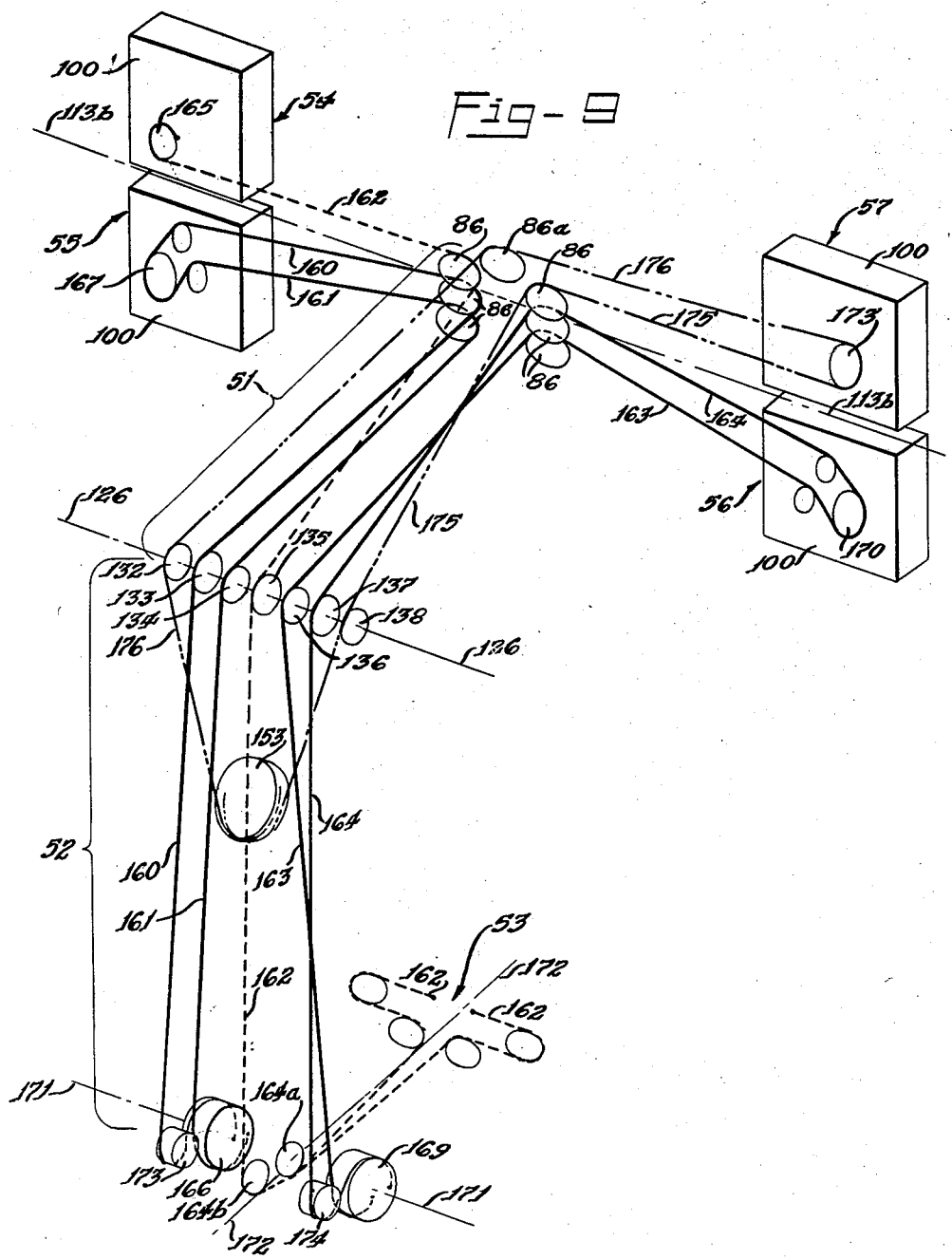
Fig. 9 is a diagrammatic perspective view illustrating the cables that respond to opening and closing of the handle, other movements thereof with respect to the lower arm on which it is mounted; and rotation of the lower arm about its own axis.

The remote-control manipulator of the present invention comprises a master unit, a slave unit, and electrical connections between the units. The master and slave units are identical except in a small number of features that will be described later.

As shown in Figs. 1, 2, 6, and 7, the master unit comprises a support 50, a generally horizontal arm 51, a generally vertical arm 52, a tool 53, and seven assemblies 54, 55, 56, 57, 58, 59, and 60, which electrically transmit forces and electrically receive reactions resulting from the forces transmitted. The seven assemblies of the master unit are electrically connected with the seven assemblies of the slave unit so that seven types of motion occurring in one unit are reproduced in the other unit.

The tool on the master unit is a handle that is adapted to be engaged by the hand of an operator, and the tool on the slave unit is a claw or grasper that is adapted to engage the object to be manipulated. Reference is made to Goertz et al. Patent 2,774,488, dated December 18, 1956, for a complete showing of the handle, the grasper, and the mountings thereof on arms of the master and slave units. In the manipulator of the present invention the tool 53 of each of the master and slave units is connected with the lower end of the generally vertical arm 52.

The seven types of movement transmitted by the assemblies between the master and slave units are: (1) rotation of the arm 51 about its own axis; (2) rotation of the arm 51 about an axis near its inner end at the support 50 and perpendicular to the axis of the arm 51; (3) rotation of the arm 52 about an axis perpendicular to the axes of the arms 51 and 52 and located at a connection between the outer end of arm 51 and the inner end of arm 52; (4) opening and closing of the tool 53; (5) rotation of the tool 53 about the axis of the arm 52; and (6) and (7) rotation of the tool 53 about two axes at the lower end of arm 52. Each of assemblies 54, 55, 56, 57, 58, 59, and 60 of one of the master and slave units transmits a signal to the corresponding assembly of the other units, which signal indicates a position of the arm 51, arm 52, or handle 53.

As shown in Figs. 6 and 8, the support 50 comprises an upper hollow portion 61 and two depending legs 62 and 63 which are integral with the hollow portion 61 and extend therefrom in spaced parallel relationship to one another. The support 50 may be attached to a separate support, not shown, by fastening means going through the top of the hollow portion 61. Short tubular pieces 64 and 65 are secured in the legs 62 and 63, respectively, in alignment with one another and journal at their inner ends by means of bearings 63a, a carriage 66 for the horizontal leg 51. Reinforcing webs 66a extend between the legs 62 and 63 and the outer regions of the hollow portion 61. The carriage 66 has angularly related tubular portions 67 and 68, the inner end of the horizontal arm 51 extending through portion 68 and across portion 67 and being journaled on bearings 69 and 70 mounted in the tubular portions 67 and 68. The carriage 66 has side portions 71 that extend from the outer ends of the tubular portions 67 transversely thereto and are interconnected at their ends by a depending V-shaped web 72. The carriage 66 has a bracket portion 73 extending downwardly from the tubular portion 68.

As shown in Figs. 7 and 8, the bracket portion 73 and the web 72 provide a mounting for a tubular structure 74, which has at its ends interior surfaces 75 and 76 which are eccentric to the exterior end surfaces which engage the bracket portion 73 and the web 72. The eccentric interior surfaces 75 and 76, respectively, provide mountings for a bearing 77 and an annular flange 77a formed on a gear box 78 of the assembly 60. The bearing 77 and a bearing 78a within the flange 77a journal a shaft 79 which extends into the gear box 78. A pinion 80 secured to the shaft 79 meshes with a segmental gear 81 secured to the inner end of the horizontal arm 51. The gear box 78 is supported in the tubular structure by the flange 77a and is prevented from rotating about the shaft 79 by a pin 81a anchored in the gear box and extending through a slot in the web 72. Adjustment of the mesh of the pinion 80 with the segmental gear 81 is effected by angular adjustment of the tubular structure 74, because of the eccentricity of the interior surfaces 75 and 76 with respect to the exterior surfaces of the tubular structure 74. The shaft 74 is shifted toward or away from the horizontal arm 51. Since the gear box 78 is mounted through its flange 77a on the surface 76, the gear box also is shifted. This shifting is permitted by the pin-and-slot connection of the gear box with the web 72.

As shown in Figs. 6 and 7, the side portions 71 are provided with interior projections 82 to the top and bottom of which upper and lower plates 83 and 84 are secured. A pair of shafts 85 is mounted in and extends between the plates 83 and 84 and journals two sets of three pulley guides 86. A seventh pulley guide 86a is positioned above and between the sets of pulleys 86, as shown in Fig. 8, and is journaled on and carried by a shaft 86b secured in the top plate 83, as shown in Fig. 7. The two sets of guides 86 are provided with two guards 86c secured to the plates 83 and 84, and the guide 86a is provided with a guard 86d secured to the upper plate 83. The guards 86c and 86d prevent cables running over the guides 86 and 86a from moving out of alignment with the guides when the cables become loosened. Opposite each guide 86 or 86a there is a slot 86e in the guard 86c or 86d, which slot has a narrow portion at the face adjacent the guide and a wide portion spaced from said face. The wide portion is large enough to pass an enlarged plug on the end of a cable used to retain the same in a take-up sheave. The enlarged plug will pass through the wide portion of the guard slot 86e when the cable is fed endwise over the pulley guide for installation on the manipulator.

As shown in Figs. 6 and 8, a gear 87 is secured to one side 71 of the carriage 66 adjacent the leg 63 of the support 50 and meshes with a pinion 88 which is secured to a shaft 89 which extends through the support leg 63 and into a gear box 90 of the assembly 58. The gear box is firmly attached to the support leg 63 and extends therealong. At the leg 62 of the support 50 there is a gear 91 which is journaled by bearings 91a on the short tubular piece 64. A crank arm 92 is secured to one face of the gear 91 so as to form at its inner end an extended hub for the gear. The outer end of the crank arm 92 and the gear 91 journal in bearings 93 and 94 a pin 95 to which one end of a link 96 is connected. As shown in Figs. 1 and 6, this link extends generally parallel to the horizontal arm 51 and has its other end connected at 97 to the vertical arm 52. As shown in Figs. 7 and 8, the gear 91 meshes with a pinion 98 which is secured to a shaft 98a extending through the leg 62 of the support 50 into a gear box 99 of the assembly 59. The gear box is firmly attached to the support leg 62 and extends therealong.

Each of the assemblies 54, 55, 56, and 57 includes a gear box 100 which is mounted on the leg 62 or 63 of the support 50 and extends transversely to said leg. Each gear box 100 is resiliently urged outwardly away from the support leg so that the tightness of the cable or cables connected with the assembly is maintained. As shown in Figs. 10, 12, and 14, each gear box 100 is provided with an inner end wall 101 and an internal wall or brace 102 through which extends a rod 103 having an inner threaded end 104 in threaded engagement with the support leg 62 or 63. In the hollow interior of the rod 103 are positioned a spring 105 and a slidable plug 106. A retaining ring 107 mounted in the rod 103 prevents the spring 105 from pushing the plug out of the rod 103. The plug 106 is engaged by the end of a threaded member 108 threaded through a nut 109 secured in an outer end wall 110 of the gear box 100. The member 108 may be adjusted to project a greater amount or a smaller amount into the gear box 100 and is retained in a desired position by a jam nut 111. The rod 103 extends through the gear box 100 near the upper end of the assembly 55 or 56 and near the lower end of the assembly 54 or 57. Each gear box 100 is guided and prevented from rotating about the rod 103 by means of short rod 112 and a slotted piece 113 receiving the rod 112. The rod 112 is threaded into the support leg 62 or 63, and the slotted piece 113 is secured to the gear box 100 at the side opposite that to which the rod 103 is adjacent. The spring 105, acting through the plug 106, member 108, and nut 109, urges the gear box 100 outward away from the leg 62 or 63. Such action is limited by engagement of the plug 106 with the retaining ring 107. Outward movement of the gear box 100 away from the support leg 62 or 63 is also limited by engagement of the slotted piece 113 with a pin 113a extending through the short rod 112. Adjustment of the threaded member 108 with respect to the gear box 100 provides an adjustment on the compression of the spring 105 and thus an adjustment in the force with which the gear box 100 is urged outward away from the support leg 62 or 63 for any given position of the gear box against certain cables that will be described later.

As shown in Fig. 6, the horizontal arm 51 is mounted in the carriage 66 for rotation therewith about an axis 113b which lies adjacent the inner end of the horizontal arm and which axis is coincident with that of the tubular pieces 64 and 65 by means of which the carriage is mounted on the support legs 62 and 63. The horizontal arm 51 is held against axial movement with respect to the carriage 66 by means of the segmental gear 81 secured to the inner end of the horizontal arm and a threaded collar 114 which has threaded engagement with the horizontal arm so as to be adjustable therealong, the gear 81 and the collar 114 engaging the bearings 69 and 70, respectively. These bearings permit the horizontal arm 51 to have angular movement about its own axis with respect to the carriage 66.

As shown in Figs. 7 and 8, a counterweight 115 for the carriage 66 and the horizontal arm 51 lies thereabove. The counterweight 115 is curved and is spaced from the arm and carriage so as to clear a counterweight 116 and a rod 117 upon which it is mounted. One end of the counterweight 115 is secured to the gear 87 by means of a short strap 118 and screws 119 and 120, and the other end of this counterweight is secured to one side portion 71 of the carriage 66 by means of a long strap 121 and screws 122 and 123. The counterweight 115 moves with the horizontal arm 51 and the carriage when they move angularly about the axis 113b. When the horizontal arm 51 moves about its own axis it moves with respect to the counterweight 115.

The counterweight 116, which is rod-like, moves conjointly with the horizontal arm 51 when the latter moves angularly about its own axis, and also moves with respect to the horizontal arm 51 when the vertical arm 52 moves angularly with respect to the horizontal arm. As shown in Figs. 1, 3, 4, and 7, the counterweight 116 is connected with the vertical arm 52 by means of a hollow rod 117, one end of which receives the counterweight 116 in a threaded connection providing for adjustment and the other end of which is pivotally connected at 124 to the upper end of the vertical arm 52. The rod 117 is also carried on the horizontal arm 51 by means of a pair of legs 125, which as shown in Fig. 8 are interconnected by a member 125a and as shown in Figs. 1 and 6 have their ends connected to intermediate portions of the rod 117 and the horizontal arm 51. The legs 125 are parallel with the vertical arm 52 and keep the rod 117 parallel with the horizontal arm 51.

As shown in Fig. 4, the horizontal arm 51 and the vertical arm 52 are pivotally connected with one another for angular movement about a pivot axis 126 by means of two stub shafts 127 and two bearings 128, one of each being shown in Fig. 4. The stub shafts 127 have threaded engagement with two legs 129 which form part of a stationary or nonrotatable section 130 of the vertical arm 52. The word "nonrotatable" as applied to the section 130 means that no rotation of the section 130 takes place about the axis of the vertical arm 52. The bearings 128 engage the stub shafts 127 and are mounted in ears 131 formed on the outer end of the horizontal arm 51.

As shown in Fig. 4, there is provided between the legs 129 at about the level of the shafts 127 a plurality of guide pulleys 132, 133, 134, 135, 136, 137, and 138 which are journaled upon a shaft 139. As shown in Figs. 3 and 4, this shaft is carried by two parallel triangular frames 140 at one corner thereof. These frames are pivotally supported at another corner on a shaft 141 carried by horizonal projections 142 on the legs 129 of the vertical arm 52. The frames 140 carry at the third corner a shaft 143 on the ends of which are mounted roller followers 144 which engage cams 145 secured to the ears 131 of the horizontal arm 51. The purpose of the aforesaid arrangement for mounting the pulley guides 132, 133, 134, 135, 136, 137, and 138 is to shift them a small amount transversely with respect to the pivot axis of the vertical arm 52 on the horizontal arm 51 and thus to preserve the tightness of the cables that go over these pulleys in the various angular positions of the vertical arm with respect to the horizontal arm.

In addition to the nonrotatable section 130, the vertical arm 52 has a rotatable section 146 which is capable of angular movement with respect to the nonrotatable section about the axis of the vertical arm. This rotatable section 146 may be termed an inner tube and as shown in Fig. 3 is journaled by means of upper and lower bearings 147 within an outer tube 148 which forms a part of the nonrotatable section 130. The tube 146 is held against axial movement with respect to the tube 148 through the lower bearing 147 which has its inner race secured to the section 146 and its outer race retained in a ring 148a by a snap ring 148b. The ring 148a is adjustable with respect to the tube 148 by a threaded connection therewith and is fixed to the tube 148 by a jam ring or nut 148c. As shown in Fig. 1, the lower end of the rotatable section or inner tube 146 projects well beyond the outer tube 148 and carries a housing 149 within which shafts, gears, and guides are mounted by means of which the handle 53 is mounted and transmits motion, as shown in the aforementioned Goertz et al. Patent 2,774,488.

As shown in Fig. 3, a tubular carrier 150 is positioned within the rotatable inner tube 146 so as to rotate with respect thereto and to be guided thereby by means of upper and lower sets of rollers 151 carried on rings 151a adjustably fixed to the exterior of the rotatable tube 146 and projecting through slots formed therein. The upper set of rollers 151 engage the exterior of the tubular carrier 150. The lower set of rollers engage a grooved ring 151b fixed to the exterior of the carrier 150. In this way the carrier 151 is fixed with respect to the tube 146. The upper end of the rotatable inner tube 146 is provided with a bevel gear 151c which meshes with a bevel gear 152 secured to a take-up sheave 153. This sheave is journaled upon a stub shaft 154 mounted in a bracket 155, attached to the nonrotatable section 130 of the vertical arm 152. The take-up sheave 153 carries a bevel gear 156 which meshes with a bevel gear 157 mounted on the top of the tubular carrier 150.

As shown in Fig. 5, a shaft 158 is mounted in the lower end of the carrier 150 and rotatably supports two pulley guides 159. The arrangement of the bevel gears 151c, 152, 156, and 157 at the upper ends of the rotatable section 146 and the carrier 150 is such that when the rotatable section 146 moves through a certain angle with respect to the nonrotatable section 130 of the vertical arm 52, the tubular carrier 150 moves through half that angle. The shaft 158 and the pulley guides 159 mounted thereon are positioned about midway between the pivot of the horizontal arm 51 on the vertical arm 52 and the housing 149 carrying the handle 53. Thus when the handle 53 and the rotatable section 146 of the vertical arm 52 are moved through a large angle with respect to the nonrotatable section 130, cables 160, 161, 162, 163, and 164 which as shown in Figs. 3, 5 and 9 extend through and along the vertical arm 52 from the tool 53 do not become entangled with one another, being kept separated through the movement of the pulley guides 159 through half the angle through which the handle 53 moves. It is contemplated that the rotatable inner tube 146 may move through an angle a small amount less than 720° with respect to the nonrotatable inner tube. Mutually engageable stops attached to the inner tube 146 and the carrier 150 will limit the angular movement to the above value.

As shown in dotted lines in Fig. 9, the cable 162, which at one end is split into two sections connected with the tool 53 for opening and closing the same, goes to and over pulley guides 164a and 164b, thence rises through the rotatable inner tube 146 and the carrier 150 of the vertical arm 52 to and over the pulley guide 135, thence goes through and along horizontal arm 51 to and over one of the pulley guides 86, and thence proceeds outwardly through the tubular section 64 to a take-up member 165 to which it is secured. The take-up sheave 165 is supported by gear box 100 of the assembly 54 exteriorly of said gear box. When the tool 53 opens or closes, the take-up sheave 165 rotates in one direction or the other.

As shown in full lines in Fig. 9, the cables 160 and 161 have their ends secured to a take-up sheave 166 mounted in the handle housing 149 and extend upwardly therefrom through and along vertical arm 52 over opposite sides of one pulley guide 159 (Fig. 5) to and over the pulley guides 133 and 134, thence through and along horizontal arm 51 to and over two of the pulley guides 86, thence outwardly through the tubular section 64 to a take-up sheave 167 to which they are secured. The take-up sheave 167 is supported on the gear box 100 of the assembly 55 exteriorly of said gear box. As shown in full lines in Fig. 9, the cables 163 and 164 have their lower ends secured to a take-up sheave 169 mounted in the housing 149 and extend upwardly therefrom through and along the vertical arm 52 over opposite sides of one guide pulley 159 (Fig. 5) to and over the guide pulleys 136 and 137, thence through and along the horizontal arm 51 to and over guide pulleys 86, and thence outwardly through the tubular section 65 to a take-up sheave 170 to which they are secured. The take-up sheave 170 is supported on the gear box 100 of the assembly 56 exteriorly of said gear box. Rotation of the take-up sheaves 166 and 169 in the tool 53 produces rotation of the sheaves 167 and 170 on the gear boxes 100 of the assemblies 55 and 56. When the tool 53 moves angularly about an axis 171 which is coincident with the axis of the take-up sheaves 166 and 169 and is parallel to and slightly spaced from a perpendicular to the axis of the vertical arm 52, the sheaves 166 and 169 rotate in the same direction. When the tool 53 rotates about an axis 172 which is perpendicular to the axis 171 and is angularly shiftable thereabout, the sheaves 166 and 169 rotate in opposite directions. The cables 160 and 164 also go over guide pulleys 173 and 174, respectively, positioned adjacent the sheaves 166 and 169 and thus are spaced from the cables 161 and 163, respectively, so as not to become entangled therewith when the vertical arm 52 is angularly shifted about its own axis. In this respect the pulleys 173 and 174 cooperate with the guide pulleys 159, over which the cables 160, 161, 163, and 164 run on opposite sides, as shown in Fig. 5.

As shown in dash-dot lines in Fig. 9, the ends of two cables 175 and 176 are secured to the take-up sheave 153 and extend upwardly to and over pulley guides 132 and 138, thence through and along the horizontal arm 51 to and over the pulley guides 86, and 86a, and thence outwardly through the tubular section 65 to a take-up sheave 173 to which they are secured. The take-up sheave 173 is supported on the gear box 100 of the assembly 57 exteriorly of said gear box. Rotation of the vertical arm 52 about its own axis produces rotation of the sheave 153, which in turn produces rotation of the sheave 173.

It is desirable that the portions of the cables 160, 161, 162, 163, 164, 175, and 176 that go outwardly in opposite directions from the horizontal arm 51 to the gear box 100 of the assemblies 54, 55, 56, and 57 be relatively close to the pivot axis 113b about which the inner end of the horizontal arm 51 pivots with respect to the support 50, in order that such pivoting of the horizontal arm 51 may produce a minimum amount of lengthwise movement of the aforesaid cables. For this purpose the pulley guides 86 and 86a are positioned, as shown in Figs. 7 and 8, with a minimum amount of axial displacement from one another so that on one side they are as close as possible to the axis 113b. Moreover, the portions of the cables 163, 164, 175, and 176 outward of the guides 86 and 86a are kept as close to one another as possible without the danger of entanglement, and likewise the corresponding portions of the cables 160, 161, and 162. For this purpose the cables 160, 161, 163, and 164, as shown in Fig. 10 for the cables 163 and 164, are guided over pulleys 177 and 178 which although secured to the gear boxes 100 of assemblies 55 and 56, are at the level of the gear boxes 100 of the assemblies 54 and 57. Thus, as shown in Fig. 2, the cables 160 and 161 are elevated nearly to the level of the cable 162, and the cables 163 and 164 are elevated nearly to the level of the cables 175 and 176. As shown in Figs. 2, 10, and 11, the brackets 179 are secured to front walls 180 of the gear boxes 100 of the assemblies 55 and 56 and overlap the front walls 180 of the gear boxes of the assemblies 54 and 57. The position of the cable 176 outward of the guide 86a is depressed and brought relatively close to the cable 175 by a pulley guide 181 over which the cable 176 runs. The pulley guide 181 is journaled on a stub shaft 182 secured to the front wall 180 of the gear box 100 of the assembly 57.

As shown in Figs. 12 and 13, for the assembly 56, the take-up sheave 170 is secured to a shaft 183 which is journaled by a bearing 184 in the front wall 180 of the gear box 100 and by a bearing 185 in a rear wall 186 of the gear box 100. The sheave 170 is secured to the shaft 183 by means of a pin 187 extending through the shaft and a slot 188 formed in the end of the sheave 170 and receiving the pin 187. The sheave 170 is retained on the shaft 183 by means of a screw 189 threaded in the end of the shaft 183 and engaging an inner flange 190 formed in the sheave 170. A retaining ring 191 holds the screw 189 in the sheave 170. The cables 163 and 164 are prevented when slack from shifting along take-up sheave 170 from one groove to another by means of three tubular posts 192 which are secured to a ring 193 by screws 194. The tubular posts 192 are approximately equally spaced about the take-up sheave 170, as shown in Fig. 10. The ring 193 is secured to the front wall 180 by means of screws 195. A pair of screws 196 threaded through the ring 193 extend into an annular groove 197 so as to permit the take-up sheave 170 to have angular movement but to limit axial movement of the take-up sheave 170 with respect to the ring 193. Thus, the take-up sheave 170, the posts 192, and the ring 193 can be disconnected as a unit from the gear box 100 without the cables 163 and 164 coming loose from the take-up sheave 170.

Within the gear box 100 a gear 198 secured to the shaft 183 meshes with a pinion 199 secured to idler shaft 200. A gear 201 secured to the shaft 200 meshes with a pinion 202 secured to a shaft 203. The shaft 203 drives a motor 204 secured to the rear wall 186 of the gear box 100, as shown in Fig. 13, and a tachometer 205 which as shown in Fig. 1 is carried as an axial extension of the motor 204. The idler shaft 200 has a section formed as a pinion 206 which meshes with a gear 207 secured to a shaft 208 which drives a transducer which on the master side is a synchro control transformer 209 and on the slave side is a synchro transmitter 209a. The gear 207 is formed of plate sections that are interconnected by two springs 209b which maintain the gear 207 in tight mesh with the pinion 206.

The assemblies 54, 55, and 57 have parts similar to those described for assembly 56 with respect to Fig. 13. In the case of the assemblies 58, 59, and 60 the shafts 89, 98a and 79 correspond respectively to the shaft 183 of the assembly 56, and the assemblies 58, 59, and 60 are otherwise like assembly 56.

In Fig. 15 are shown in schematic form the elements of each of the assemblies 54, 55, 56, 57, 58, 59 or 60 on the master unit and its corresponding assembly on the slave unit and the electrical connections between the units. It will be understood that there are seven systems like the one indicated in Fig. 15, a system such as shown in Fig. 15 reproducing each of the various components of motion included in any operation performed by the operator. As previously pointed out, each of the aforesaid assemblies consists of a gear box 78, 90, 99, or 100, a motor 204, a tachometer 205, and a transducer 209 or 209a. Each transducer on the master unit is a synchro control transformer 209, and that on the slave unit, a synchro transmitter 209a, the transformer and transmitter being so coupled that the transformer produces an error signal E proportional in amplitude to any difference that may exist between the rotational positions of the shafts 208, the phase of the error signal corresponding to the direction of the mechanical error in register or correspondence between the rotational positions of the shafts 208. The error signal E is fed through a limiter 210 (the purpose of which will be described later) to a power amplifier 211, the output of which is fed to the control windings of the motors 204. The error signal is applied to the motors 204 in such phase as to rotate the shafts 203 in the appropriate direction to drive the positioning elements connected to the shafts 183 toward the position of correspondence with the other positioning element any time that an error occurs. The motors 204, in addition to being reversible with the phase of the voltage impressed on the control windings, are also selected to demonstrate as nearly as possible the characteristic of having, over a substantial range, a torque which varies linearly with the magnitude of the impressed voltage, and which is substantially independent of the speed of rotation of their shafts 203, preserving as nearly as possible a constant torque, even when the shaft is being driven in a direction opposing the torque, i. e., in the region of "negative" speed.

In describing the manner of operation of the system, it will be convenient to use as an example a particular set of positioning elements, such as the elements producing grasping motion, as mentioned above; it will of course be understood that the manner of operation is substantially identical in any other pair of interconnected positioning elements as regards the function and operation of the interconnection of each of the assemblies 54, 55, 56, 57, 58, 59, and 60 on the master unit with the corresponding assembly on the slave unit. Consider the operation of grasping a glass beaker (an extremely simple type of manipulation which requires only a small portion of the precision of "feel" of which the present device is capable, but is selected for illustrative purposes because it is an operation which requires, in its simplest aspect, only one electrical linkage). With the master and slave units in exact register, the operator commences to close his hand on the handle (tool 53 on the master unit) in order to make the claw (tool 53 on the slave unit) grasp the beaker at the remote location. At all reasonable speeds with which the operator performs this motion, the positioning element at the slave unit rapidly follows the motion. The operator's hand encounters no resistance (other than the negligible resistance inherent in the small return springs usually employed in such claws) despite the fact that the torque applied to the slave motor 204 to produce closing of the claw or grasper is accompanied by a similar torque produced by the master motor 204 opposing the closing motion of the handle; the counter-force exerted by the master motor 204 is not felt by the operator unless he moves too abruptly, since the error signal E will remain very small as long as the positioning element at the slave unit encounters no obstacle. However, when the slave positioning element encounters the beaker, any further closing of the grasp by the operator immediately meets rapidly increasing force in opposition to such motion, because the error signal now being produced is greatly increased because of the now greater difference between positions of corresponding elements on the master and slave units and increases the torques exerted by both the motors 204. The operator may grasp the beaker with any desired force, the force with which the beaker is grasped being identical with the opposing force or resistance felt by the operator, since the torque exerted by the two motors 204 are the same. The operator thus "feels" the exact force exerted upon the beaker, and may perform the grasping operation in substantially the same manner as if the beaker were actually present at his hand. It will, of course, be understood that, as indicated previously, the mere regulation of the force applied in a simple grasping operation is a relatively trivial application of the "feel" of which the present device is capable; however, this example serves to illustrate the principles of operation which are employed in a number of the linkages simultaneously in operations of greater precision such as fitting parts of machinery together (in which the desirability of "feel" in a number of degrees of freedom is obvious) and turning a crank (in which, although the desirability of "feel" is much less obvious, actually the precision required is very great, this being one of the most difficult operations encountered for remote performance, since this operation requires accurate feeling by the operator so that the manipulator readily yields to the restricted path of motion of the crank, thus preventing breakage or bending of the equipment being manipulated).

It will be seen that although the system illustrated produces a 1–1 correspondence between the forces at the master and the slave units, because of identity of design of the mechanical and electrical systems, by obvious modifications such as using two nonmatching motors 204 or introducing suitable gearing changes in the master unit or slave unit, the system may likewise be used for force multiplication or division, the force "felt" by the operator being any desired fraction or multiple of the force actually exerted on the work-piece at the slave unit. Where matched motors 204 are employed and the mechanical systems at both units are substantially identical, the two units of the manipulator are essentially symmetrical or reciprocal, either unit being equally useable as master or slave with exactly the same "feel." (It will be noted that this reciprocal or symmetrical relation may be observed in the drawing, the connection of a synchro transformer at one unit and of a synchro transmitter at the other unit being merely an apparent, rather than a real, asymmetry.) It is contemplated that in the assemblies 54 which govern opening and closing of the handle and grasper, the motor 204 on the slave unit may operate at twice the speed of the motor 204 on the master unit in order that the effective inertia at the master unit may be reduced and that the grasping force on the slave unit may be increased. In this event, the shafts 183 of the assemblies 54 of the master and slave units will rotate at the same speed, but the speed ratio of the motor 204 to the shaft 183 on the slave unit will be twice the corresponding ratio on the master unit, so that the torque of shaft 183 on the slave unit is twice the torque of shaft 183 on the master unit.

The basic operation of the system being understood from what has been said above, supplementary structure and the purpose thereof may now be readily comprehended. As previously stated, tachometers 205 are coupled to the gear boxes 78, 90, 99, and 100 the coupling being provided by attachment to the motors 204. The electrical outputs of the tachometers 205 of corresponding assemblies on the master and slave units, are combined in the following manner: Considering motion of the master and slave positioning elements as producing signals opposite in sign, the signals are algebraically added. Thus the resultant signal is proportional to the time derivative of the error and the error signal. This resultant signal is then added to the error signal in such phase or polarity as to add to the error signal when the error signal is increasing and to subtract from the error signal when the error signal is decreasing. This tachometer or derivative signal serves a two-fold purpose. First, as is well known, the provision of such a derivative signal damps the system and prevents hunting. For this purpose, the amount of such derivative or tachometer signal which is introduced into the error signal is selected or adjusted in accordance with well known practices in the servo mechanisms art to produce critical damping of the system (or sufficient over-damping to compensate for diminution of damping due to such factors as aging and other changes in circuit parameter, etc.). The derivative signal also increases the speed of response of the slave unit to the master unit, since upon actuation of the master unit, the derivative signal adds to the error signal fed to the motor 204 of the slave unit an additional signal in the same direction. Further, this derivative signal serves an important purpose under abnormal conditions, to be discussed below, which might otherwise be hazardous to personnel and to other equipment, as well as to the manipulator itself.

As previously pointed out, in normal operation no large error signal will appear, because the slave unit will closely follow the master unit. However, under certain conditions, carelessness upon the part of the operator might, in the absence of the safety provisions now to be discussed, create a hazard both to the mechanism itself and to personnel and equipment in the vicinity of either the master unit or the slave unit. It will be seen that when no power is applied to the electrical equipment, the master and slave positioning elements may be readily moved independently of each other. Thus, unless extreme care is taken, it is likely that the device will be turned on at a time when at least one pair of corresponding positioning elements are completely out of correspondence in position. In such a case, an extremely large error signal E immediately appears, and, but for the safety provisions, there would result an extremely high speed motion of both positioning elements toward the position of correspondence. The rapid whipping motion occasioned by such an occurrence might well cause serious injury in the event that a person or object were in the path of such motion. A similar hazard would arise if, for example, the slave positioning element were to encounter an obstacle, and the operator should exert sufficient force to create a large error signal and the obstacle should then be removed, as by toppling over.

To prevent such high-speed operation in this type of circumstance, the limiter 210 is inserted in the error signal line. The limiter is designed or adjusted to clip the error signal at a level corresponding (in the absence of a derivative signal) to approximately the maximum voltage on the motors 204 (corresponding to the maximum speed of the shafts 183) for which the system is designed. When the positioning elements are moving toward the position of correspondence, as in the case where the device is turned on at a time when the elements are badly out of correspondence, the derivative of the error has a maximum negative value, which is algebraically added to the error signal. With the derivative signal added after the limiter 210, the derivative signal reduces the signal fed to the motors to a level substantially below the setting of the limiter. If the derivative error signal were introduced before the limiter, the voltage applied to the motors would still be the maximum set by the limiter. Since, in normal operation of the machine, the positioning elements in both units are moving in the same direction, and since, in the abnormal conditions mentioned above against which safeguards are to be taken, the positioning elements are moving in opposite directions, the provision of the derivative signal and its introduction after the limiter achieve the highly desirable result that under the abnormal conditions to be safeguarded against, wherein the error is rapidly decreasing, the rapidity of motion is damped, while in normal operation wherein the motions of the operator slightly lead the slave, the full limiter voltage may be applied to the amplifier. The amplifier is designed to saturate at a level, equal to, or slightly below, the maximum power input for which the motors are designed, in order to prevent motor damage in the event of excessive error signals caused by such occurrences as the application of excessive force by the operator when the slave unit meets an obstruction.

A variety of components may of course be employed in the system, and the choice of such components may readily be made from those available in the art. Motors having the desired characteristic of exercising torque which is substantially independent of speed and direction of rotation are known. However, in general such motors are of relatively low power. It has been found that the torque versus speed characteristic of the system, when more powerful two-phase motors are employed, may be substantially flattened by tuning the control voltage windings to the frequency of the power source, and by connecting these control windings in series, rather than in parallel, as is the usual connection.

In Fig. 16 is shown in somewhat more detailed form one construction of the system illustrated in block form in Fig. 15. Each of the motors 204 has an energizing winding 204e and a control winding 204c, the control windings 204c being connected in series across the output of the power amplifier 211. The tachometers 205 have energizing windings 205e and output windings 205o, connected in series across a load attenuator 212. In one construction of the system shown, the motors 204 and tachometers 205 were two-phase 60 cycle low inertia servo motors with 60 cycle induction tachometer generators attached made by Diehl Manufacturing Co. No. FPE25-81-6. When these particular components are employed, it is found that the condensers 214, connected across the motor control windings 204c for the purpose of making the torque substantially independent of speed and direction over a large range, should desirably be 2 microfarad condensers. The synchro transmitter 209a and the synchro transformer 209 have the usual interconnected three-phase windings 209w and 209x, the transmitter 209a having an energizing winding 209e, and the control transformer 209 having an output winding 209o, the output of which is connected to an attenuator 216. Suitable matched components for these elements are Navy type No. 23TX6 transmitter and type No. 23CT6 transformer.

The power amplifier 211 is of a conventional type, and is accordingly illustrated in merely fragmentary form and is not further described herein. However, the limiter 210 is of a novel type which limits the amplitude of the sine wave voltage transmited from the attenuator 216 without distorting the sinusoidal wave form. The limiter 210 employs a control voltage provided by the primary 218p of a transformer 218 having a center-tapped secondary 218s connected across a bridge rectifier 220 connected to a resistive load consisting of series-connected resistors 222, 224, 226, 228, 230 and 232. Bridged across resistors 224, 226, 228 and 230 are a pair of series-connected diodes 234 and 236, the cathode of the diode 234 being connected to the positive end of the voltage divider thus formed, and the anode of the diode 236 being connected to the negative end. The electrical center of the series combination of resistors is grounded, as are the center tap of the transformer secondary 218s and one terminal of the attenuator 216. The junction of the diodes 234 and 236 are connected to the tap of the attenuator 216 through a series resistor 238, which is of much greater magnitude than the other resistors employed in the limiter.

It will be seen that the diodes 234 and 236 constitute mutually inverted rectifiers shunted across the signal transmission path, and there are impressed on the electrodes thereof unconnected to the series resistor full-wave rectified sine-waves of a polarity opposing conduction in the respective rectifiers, so that they will never conduct unless the voltage being transmitted from the attenuator 216 is sufficiently high to overcome the rectified sinusoidally varying inverse voltage at the cathode of diode 234 and at the anode of diode 236. Thus, up to this level, the limiter produces no effect on transmission of the sinusoidal signal. However, if greater voltages appear at the tap on the attenuator 216, any excess instantaneous voltage is dropped across the high resistor 238, since the diode 234 or 236 (depending upon the instantaneous polarity) acts as a short across which no substantial voltage can appear. Thus the potential at the junction of the diodes 234 and 236 follows the constant amplitude fixed by the transformer 218 when the level of the voltage from the attenuator 216 exceeds a given value. Since the voltage appearing at the cathode of the diode 234 in the portion of the cycle in which it conducts is sinusoidal, and the voltage appearing at the anode of the diode 236 is sinusoidal in the portion of the cycle in which it conducts, the output is at all times of sinusoidal form, despite the limiting action, so that the limiter is essentially distortionless.

Condensers 240 and 242 bridged across the resistors 226 and 228 provide inverse bias on the diodes 234 and 236 in order to prevent conduction in the diodes due to thermionic energy, which may otherwise produce small "pips" at the output.

Because of a degree of phase shift in the system, the primary 218p is connected to the power source through a suitable phase-shifting device (not illustrated).

In one construction employed, the resistors 222 and 232 were 1000 ohms, the resistors 224, 226, 228 and 230 510 ohms, and the condensers 240 and 242 100 microfarads, the resistor 238 being 100,000 ohms. In this construction the transformer 218 was a 6.3 volt filament transformer.

The master unit of the manipulator of the present invention is capable of seven motions that are automatically reproduced in the slave unit as they are made. These motions are (1) pivoting of the horizontal arm 51 about the transverse axis 113b adjacent its inner end; (2) pivoting of the horizontal arm 51 about its own longitudinal axis; (3) pivoting of the vertical arm 52 about the transverse axis 126 at its upper end; (4) pivoting of the vertical arm about its own longitudinal axis; (5) pivoting of the tool 53 with respect to the vertical arm 52 about the transverse axis 171 at the lower end of the vertical arm; (6) pivoting of the tool 53 with respect to the vertical arm 52 about another transverse axis 172 at the lower end of the vertical arm, which axis is perpendicular to the axis 171; and (7) opening and closing of the tool.

These motions are transmitted individually from the master unit to the slave unit through the assemblies 54 to 60: motion (1) through the assemblies 58, gears 87 and 88, and carriages 66 (Figs. 6 and 8); motion (2) through the assemblies 60, shafts 79, and gears 80 and 81 (Fig. 7); motion (3) through the assemblies 59, gears 91 and 98, and link 96 (Figs. 1, 6, and 8); motion (4) through the assemblies 57, cables 175 and 176, take-up sheaves 153, and gears 151c and 152 (Figs. 3 and 9); motion (5) through the assemblies 55 and 56, cables 160, 161, 163, and 164, and take-up sheaves 166 and 169 (Fig. 9); motion (6) through the same parts; and motion (7) through the assemblies 54 and cables 162 (Fig. 9).

As shown in Fig. 9, motions (4), (5), (6), and (7) involve longitudinal movement of cables 160, 161, 162, 163, and 164. Each of these motions involves a separate set of assemblies 54 to 60, with the exception of the motions of the tools 53 about the axes 171 and 172 at the lower ends of the vertical arms 52. Each of these motions involves two sets of assemblies 55 and 56.

It will be observed from Fig. 9 that each of the assemblies 55, 56, and 57 receives or transmits motion by way of two cables, whereas the assembly 54 has only one cable 162 associated therewith. This single cable is sufficient to transmit the opening and closing motion of the tool 53 in both directions, because the grasper or claw, which is the tool on the slave unit, carries a spring that acts to open the claw when closing pressure on the claw is released. This is fully shown in the aforementioned Goertz et al. Patent 2,774,488. In other words, opening of the handle is not directly produced at the handle, but indirectly through the grasper. Thus when the operator releases the handle 53 on the master unit, the spring on the grasper 53 on the slave unit creates a difference in the amount of closing between the handle and the grasper, which difference acts as shown in Fig. 15 through the motor 204 on the master unit to pull the cable 162 in a direction calculated to open the handle on the master unit. When the handle is being opened, the spring action in the grasper or claw makes the take-up sheave 165 of the assembly 54 on the master unit pull the cable 162 toward it, whereas the handle pulls the cable 162 in the opposite direction when the operator is closing the handle.

It has been stated that seven motions, with the exception of two angular movements of the tool 53 about the lower end of the vertical arm 52, are transmitted through separate sets of assemblies 54 to 60. Although it is theoretically possible for only one of the seven motions to occur at one time, this is unlikely because of the mechanical arrangement of the master and slave unit of the present manipulator. Thus for example, if the handle 53 on the master unit is merely to be raised, without being shifted horizontally or tilted upward, angular movement of the horizontal arm 51 about the transverse axis 113b must take place, and this movement will necessarily be accompanied by pivoting of the vertical arm 52 about the transverse axis 126 near its upper end in order that the tool 53 on the lower end of the vertical arm may not be shifted horizontally, and this in turn will be accompanied by angular movement of the tool 53 about the transverse axis 171 at the lower end of the vertical arm to compensate for the resulting shift of the vertical arm 52 with respect to the vertical direction.

The spring or resilient mountings of the gear boxes 100 of the assemblies 54, 55, 56, and 57 have been previously described. As shown in Fig. 14, these gear boxes are mounted on rods 103 which contain springs 105 which tend to urge the gear boxes 100 outwardly away from the vertical support legs 62 and 63 upon which they are carried. This spring action tends to maintain the tightness of the cables 160, 161, 162, 163, 164, 175 and 176. These spring mountings are necessary, because each of the seven aforesaid motions taking place on the master and slave units can involve at least a small amount of longitudinal shifting of those of the aforesaid cables that are not supposed to be involved in the motion in question.

With reference to Fig. 9, consider for example, angular movement of the horizontal arm 51 about the transverse axis 113b (Fig. 6) adjacent its inner end. The portions of the cables 160, 161, 162, 163, 164, 175, and 176 that run outwardly from the guides 86 and 86a to the gear boxes of the assemblies 54, 55, 56, and 57 have previously been described as being brought as close to one another as possible and as nearly coincident with the axis 113b as possible. However, there must be sufficient vertical spacing between these outwardly extending portions of the cables for entanglement between them to be avoided, and such separation must necessarily involve displacement of these portions of the cables from the pivot axis 113b (but not so much as shown in Fig. 9, wherein the spacing of the outwardly extending portions of the cables has been exaggerated for the sake of clarity). When angular movement of the horizontal arm 51 about transverse axis 113b takes place, the guides 86 and 86a angularly shift with respect to the take-up sheaves 165, 167, 170, and 173 on the gear boxes 100 of the assemblies 54, 55, 56, 57, and so a change in the spacing between these guides and sheaves results, which could produce unsatisfactory tightening or loosening of the cables, unless the gear boxes 100 had the resilient spring mountings previously described.

When the horizontal arm 51 is moved angularly about its own longitudinal axis, the pulley guides 132 to 138 at the outer end of the horizontal arm shift angularly with respect to the pulley guides 86 and 86a near the inner end of the horizontal arm, as will be evident from Fig. 9; and this angular shifting results in a change in spacing between the two sets of pulley guides, which might create unsatisfactory tightening or loosening of the cables if the gear boxes 100 were not resiliently mounted.

When the vertical arm 52 pivots about the axis 126 with respect to the horizontal arm 51 the amount of wrap of the cables about the guides 132 to 138 changes and can result in tightening or loosening of the cables. Of course some compensation for this is provided by the adjustable mounting of guides 132 to 138 on the cam-controlled side frames 140, as shown in Figs. 3 and 4.

When the vertical arm 52 moves angularly about its own longitudinal axis, the take-up devices 166 and 169 and the guides 164b, 173 and 174 are changed in their spacing from the guides 133—137 through angular shifting, as is evident from Fig. 9. This action also can produce tightening or loosening of the cables. It has been previously stated that the lower end of the vertical arm 52 and the tool 53 may rotate through about 720°. A displacement of 360° will return the take-up sheaves to their original position with respect to the guides 133—137, but the portions of cables 160, 161, 163, and 164 extending therebetween will have lengthened, because the mid regions of these cable portions will have been displaced only 180° by the guides 159 (Fig. 5).

Since angular movements of the horizontal arm 51 about the transverse axis 113b and about its own longitudinal axis and angular movement of the vertical arm 52 about the transverse axis 126 are transmitted to the assemblies 58, 60, and 59, respectively, not through cables, but through gears 87 and 88, 81 and 80, 91 and 90, respectively (Figs. 7 and 8), the associated gear boxes 90, 78, and 99 are fixedly mounted on the support legs 63 and 62 and the carriage 66.

The intention is to limit the invention only within the scope of the appended claims.

What is claimed is:

1. A remote-control manipulator comprising a master unit and a slave unit; each unit comprising a first arm having inner and outer ends, means mounting said first arm for angular movement about its own axis and about an axis perpendicular thereto at said inner end, a second arm having inner and outer ends, means connecting the inner end of the second arm with the outer end of the first arm for causing the second arm to have conjoint angular movement with the first arm about the axis of the latter and for enabling the second arm to have angular movement with respect to the first arm about an axis perpendicular to the axis of the first arm at the outer end thereof, a tool, and means mounting the tool on the outer end of the second arm for angular movement about the axis of the second arm and about two more axes angularly related to the axis of the second arm and extending through the outer end of the second arm in angular relationship to one another; means for producing electrical signals responsive to the aforesaid angular movements of the first and second arms and the tool of the one unit and to opening and closing of the tool thereon; and means responsive to said signals for producing corresponding angular movements of the first and second arms and the tool of the other unit and opening and closing of the tool thereon.

2. A remote-control manipulator comprising a master unit and a slave unit; each unit comprising a first arm having inner and outer ends, a carriage journaling the inner end of the first arm for angular movement thereof about its own axis, a support having side pieces receiving between them the carriage, means journaling the carriage in the support for angular movement of the carriage and the first arm about an axis perpendicular to the axis of the first arm, a second arm having inner and outer ends, means connecting the inner end of the second arm to the outer end of the first arm for pivotal movement with respect thereto about an axis perpendicular to the axis of the first arm, a tool mounted on the outer end of the second arm for angular movement with respect thereto about three different axes including that of the second arm, four force-receiving and -transmitting assemblies mounted on the outer faces of the side pieces, flexible tie means extending from the tool and the second arm, through the first arm and the carriage, and in opposite directions through the side pieces at about the pivot axes of the carriage thereon to the four assemblies, whereby signals for opening and closing of the tool and for angular movement of the tool about the three axes with respect to the second arm are produced, a fifth force-receiving and -transmitting assembly mounted on the outer face of one side piece and being responsive to angular movement of the first arm about the pivot axis of the carriage on the side pieces, a sixth force-receiving and -transmitting assembly mounted on the outer face of the other side piece and being responsive to angular movement of the second arm with respect to the first arm, and a seventh force-receiving and -transmitting assembly mounted on the carriage and being responsive to angular movement of the first arm about its own axis.

3. The manipulator specified in claim 2, the fifth assembly being connected with the first arm by means including a gear secured to the carriage coaxially with the pivot of the carriage next to the side piece to which the fifth assembly is attached, the sixth assembly being connected with the second arm by means including a gear journaled coaxially with the carriage on the side piece to which the sixth assembly is attached and a link tying the second arm to the last mentioned gear.

4. A remote-control manipulator comprising a master unit and a slave unit; each unit comprising a first arm having inner and outer ends, a support mounting the first arm for angular movement about a pivot axis adjacent its inner end, a second arm having inner and outer ends, means pivotally connecting the inner end of the second arm with the outer end of the first arm, a tool connected with the outer end of the second arm for angular movement about three axes with respect to the second arm and being capable of opening and closing, four force-receiving and -transmitting assemblies mounted on the support, two on one side of the first arm, two on the other side thereof, and cables extending from the tool along the second arm to its inner end, thence along the first arm to its inner end, and thence in opposite directions generally along the pivot axis of the first arm on the support to the four assemblies, the cables serving to transmit the aforesaid opening and closing and angular movement of the tool about three axes to the four assemblies.

5. The manipulator specified in claim 4, the assemblies being mounted on the support by means including springs urging the assemblies outwardly away from the first arm and thereby keeping the cables tight in spite of the tendency of certain cables transmitting angular movement of the tool about one of said three axes to be loosened by angular movement of the tool about another of said three axes.

6. A remote-control manipulator comprising a master unit and a slave unit; each assembly comprising a first arm having inner and outer ends, a support mounting the first arm for angular movement about a pivot axis adjacent its inner end, a second arm having inner and outer ends, means pivotally connecting the inner end of the second arm with the outer end of the first arm, a tool connected with the outer end of the second arm for movement with respect thereto, force-transmitting and -receiving assemblies mounted on the support on opposite sides of the first arm, and cables extending from the tool along the second arm to its inner end, thence along the first arm to its inner end, and thence in opposite directions generally along the pivot axis of the first arm on the support to the assemblies, the cables serving to transmit movement of the tool with respect to the second arm to the assemblies.

7. The manipulator specified in claim 6 and further comprising an additional force-transmitting and -receiving assembly mounted on the support to one side of the first arm, means making said last mentioned assembly responsive to angular movement of the first arm about its inner end and including a gear mounted coaxially with the pivot axis of the first arm on the support on the said one side of the first arm for conjoint angular movement therewith, a second additional force-transmitting and -receiving assembly mounted on the support on the other side of the first arm, and means making the last mentioned assembly responsive to pivoting of the second arm with respect to the first arm and including a gear mounted on the said other side of the support coaxially with the pivot axis of the first arm for angular movement about said pivot axis with respect to the first arm and the support and a link connecting the last mentioned gear and the second arm.

8. The manipulator specified in claim 7 and further comprising a carriage placed between the support and the first arm so as to provide for angular movement of the first arm about said pivot axis adjacent the inner end of the first arm, the first arm being mounted in the carriage for angular movement with respect thereto about the axis of the first arm, an additional force-transmitting and -receiving assembly responsive to angular movement of the first arm about its own axis, and means mounting the last mentioned assembly on the carriage.

9. A force-reflecting servo system for a remote-control manipulator having master and slave units provided with corresponding movable master and slave elements, each capable of occupying a plurality of positions, there being for each position of the master element a corresponding position of the slave element, said servo system comprising means coupled to said master and slave elements and responsive to a difference between the actual position of the slave element and the ideal position thereof corresponding to the actual position of the master element to produce an electrical signal proportional to said difference, and means responsive to said electrical signal to exert a force upon the master and slave elements tending to bring the slave element to the said ideal position and the master element to the position corresponding to the actual position of the slave element, whereby the slave element follows the master element and mechanical resistance and opposing force encountered by the slave element produces corresponding mechanical resistance and opposing force in the operation of the master element.

10. The system of claim 9 and further comprising signal-limiting means coupled to the signal-producing means and constructed and arranged to limit the electrical signal and thus to limit the speed of operation of the device upon the occurrence of abnormal conditions.

11. The system of claim 9 and further comprising means coupled to the master and slave members for producing an electrical signal proportional to any difference between the speeds of motion thereof, and means for opposing said latter electrical signal against said first electrical signal.

12. The system of claim 9 and further comprising signal-limiting means coupled to the signal-producing means and constructed and arranged to limit the electrical signal and thus to limit the speed of operation of the device upon the occurrence of abnormal conditions, means coupled to the master and slave members for producing an electrical signal proportional to any difference between the speeds of motion thereof, and means for opposing said latter electrical signal against said limited electrical signal.

13. A remote-control manipulator comprising a master unit and a slave unit; each unit comprising a first arm having inner and outer ends, means mounting said first arm for angular movement about its own axis and about an axis perpendicular thereto at said inner end, a second arm having inner and outer ends, means connecting the inner end of the second arm with the outer end of the first arm for causing the second arm to have conjoint angular movement with the first arm about the axis of the latter and for enabling the second arm to have angular movement with respect to the first arm about an axis perpendicular to the axis of the first arm at the outer end thereof, a tool, and means mounting the tool on the outer end of the second arm for angular movement about the axis of the second arm and about two more axes angularly related to the axis of the second arm and extending through the outer end of the second arm in angular relationship to one another; each arm and tool of each of the master unit and slave unit being capable of occupying a plurality of positions in the aforesaid angular movements of the arms and tools and opening and closing of the tool, there being for each position of each arm and tool on the master unit a corresponding position of each arm and tool on the slave unit; and a plurality of servo systems, one for each of the aforesaid angular movements of the first and second arm and tools and opening and closing of the tool on the master unit for producing a corresponding action on the slave unit, each of said servo systems comprising means coupled to the particular arm or tool on each of the master and slave units depending on the action in question and responsive to a difference between the actual position of the slave arm or tool and the ideal position thereof corresponding to the actual position of the master arm or tool to produce an electrical signal proportional to said difference, and means responsive to said electrical signal to exert a force upon the master and slave arm or tool tending to bring slave arm or tool to the said ideal position and the master arm or tool to the actual position of the slave arm or tool, whereby the slave arm or tool follows the master arm or tool and mechanical resistance and opposing force encountered by the slave arm or tool produces corresponding mechanical resistance and opposing force in the operation of the master arm or tool.

References Cited in the file of this patent

UNITED STATES PATENTS

| | | |
|---|---|---|
| 2,476,249 | Payne et al. | July 12, 1949 |
| 2,552,348 | Shapiro | May 8, 1951 |
| 2,632,574 | Goertz | Mar. 24, 1953 |
| 2,675,473 | Femmer | Apr. 13, 1954 |

FOREIGN PATENTS

| | | |
|---|---|---|
| 174,407 | Austria | Sept. 15, 1952 |